United States Patent [19]

Koshi et al.

[11] Patent Number: 5,615,288
[45] Date of Patent: Mar. 25, 1997

[54] SINGULAR VALUE DECOMPOSITION CODING AND DECODING APPARATUSES

[75] Inventors: Yutaka Koshi; Shunichi Kimura; Taro Yokose; Koh Kamizawa, all of Kanagawa; Toshi Minami; Osamu Nakamura, both of Tokyo, all of Japan

[73] Assignee: Fuji Xerox Co., Ltd., Tokyo, Japan

[21] Appl. No.: 232,801

[22] Filed: Apr. 25, 1994

[30] Foreign Application Priority Data

Apr. 26, 1993 [JP] Japan ............................ 5-099819
Apr. 28, 1993 [JP] Japan ............................ 5-102333

[51] Int. Cl.$^6$ ............................................ G06K 9/36
[52] U.S. Cl. ..................... 382/248; 358/433; 382/233
[58] Field of Search .................... 382/232, 233, 382/244, 248, 250, 251, 276; 358/432, 433

[56] References Cited

PUBLICATIONS

"Singular Value Decomposition (SVD) Image Coding", Andrews et al., IEEE Transactions on Communications, vol. COM-24, No. 4, pp. 425–432, Apr. 1976.

"Comparative Performance of SVD and Adaptive Cosine Transform in Coding Images", Garguir, N., IEEE Transactions on Communications, vol. COM-27, No. 8, pp. 1230–1234, Aug. 1979.

"Vector Quantization of Picture Signals by Singular Value Decomposition", Komatsu et al., Shingakugiho, IE85-6, pp. 38–47, Jun. 1985.

*Primary Examiner*—Joseph H. Mancuso
*Attorney, Agent, or Firm*—Finnegan, Henderson, Farabow, Garrett & Dunner, L.L.P.

[57] ABSTRACT

An input image is divided into blocks each represented by n×n matrix X, and then $X^T X$ is calculated. Singular values of X that are positive square roots of eigenvalues of $X^T X$ and first singular vectors that are normalized eigenvectors of $X^T X$ are calculated by, for instance, the Jacobi method. Second singular vectors that are normalized eigenvectors of $XX^T$ are calculated analytically using the singular values and the first singular vectors. The singular values and the first and second singular vectors thus calculated are coded.

8 Claims, 8 Drawing Sheets

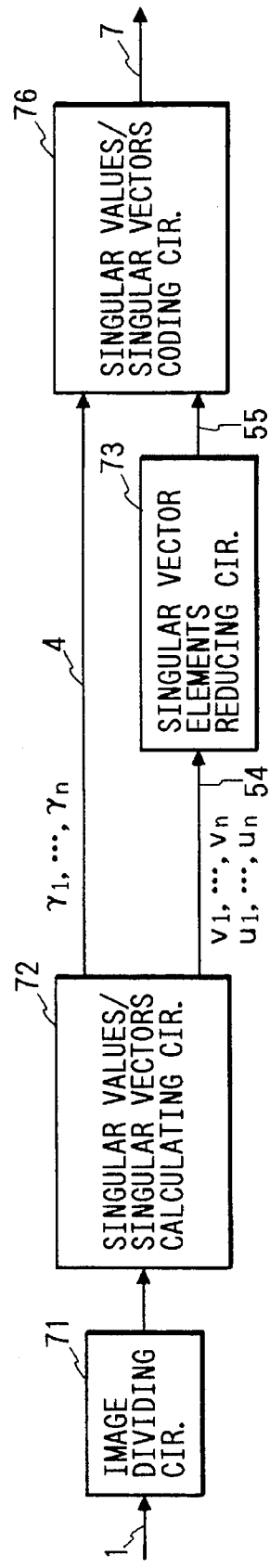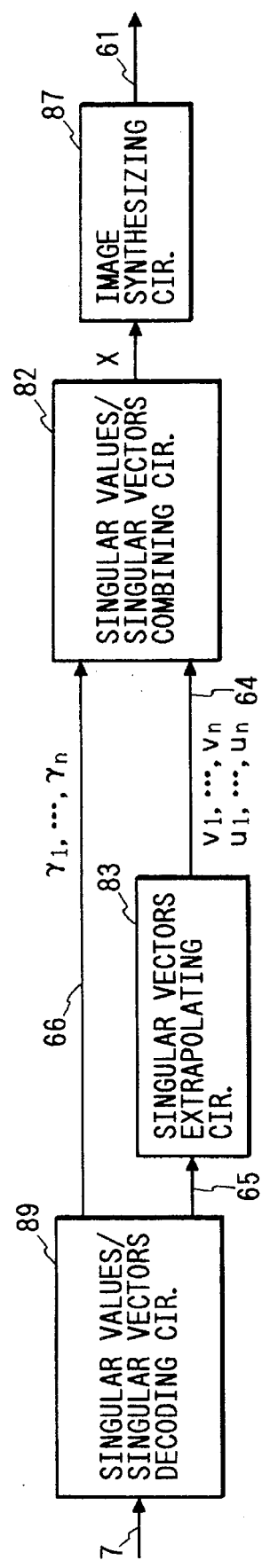

SINGULAR VALUE DECOMPOSITION CODING AND DECODING APPARATUSES

BACKGROUND OF THE INVENTION

The present invention relates to image coding and decoding apparatuses and, more specifically, to singular value decomposition image coding and decoding apparatuses.

In transmitting or storing image information, it is a general procedure to code the image information to reduce a data amount. Some of the presently available image coding techniques will be described below.

The orthogonal transform coding is performed, for instance, in the following manner:

a) Preliminarily setting a transform matrix A of, for instance, discrete cosine transform or Hadamard transform.

b) Dividing an image into blocks each of which consists of n×n pixels (n: integer equal to or greater than 2), that is, is represented by an n-row, n-column matrix X.

c) Performing an orthogonal transform on a block-by-block basis such that $$Y=AXA^T \quad (1)$$

where A is an orthogonal matrix and $A^T$ is a transpose of A.

d) Coding $n^2$ transform coefficients of Y on a block-by-block basis.

In this example, coding is performed by utilizing the fact that the power is concentrated in particular transform coefficients, for instance, by changing the number of levels for quantizing each transform coefficient in accordance with the magnitude of its power. Therefore, the coding efficiency is higher when the degree of the power deviation is larger. However, in general, since statistical properties of image information are different from one position to another, it is not always the case that image information has a large degree of power deviation. As a result, there exits a certain limit in improving the coding efficiency with the use of a single preset transform matrix.

In the Karhunen-Loève transform coding, to accommodate a positional variation of statistical properties of an image, images having similar properties are grouped into a class, and an optimum transform matrix is used for each class. The Karhunen-Loève transform coding is performed, for instance, in the following manner:

a) Dividing an image into blocks each of which consists of n×n pixels, that is, is represented by an n-row, n-column matrix X.

b) Grouping the blocks into classes.

c) Determining a vertical transform matrix Ay and a horizontal transform matrix Ax for each class.

d) Coding the transform matrices Ay and Ax having $2n^2$ elements for each class.

e) Performing an orthogonal transform for each block in accordance with the class to which the block belongs to, such that $$Y=A_y X A_x^T. \quad (2)$$

f) Coding $n^2$ transform coefficients of Y for each block.

In this example, as the number of classes increases, the power is more concentrated in particular transform coefficients and, therefore, the coding efficiency of the transform coefficients is improved. However, this will cause an increase in the number of transform matrices, which should also be coded. The extreme case is such that transform matrices are determined for each block, in which case $n^2$ transform coefficients and transform matrices having $2n^2$ elements per block need to be coded.

The singular value decomposition coding is described in H. C. Andrews and C. L. Patterson, "Singular Value Decomposition (SVD) Image Coding," IEEE Transactions on Communications, Vol. COM-24, No. 4, pp. 425–432, April 1976 (referred to as reference (1) below). This coding method not only can accommodate a positional variation of statistical properties but also requires a relatively small number of items to be coded. The singular value decomposition coding is performed, for instance, in the following manner:

a) Dividing an image into blocks each of which consists of n×n pixels, that is, is represented by an n-row, n-column matrix X.

b) Performing singular value decomposition such that $$X=U^T GV \quad (3)$$

In this equation, U and V are n-row, n-column orthonormal matrices, and $$U^T=[u_1, \ldots, u_n] \quad (4)$$

$$V^T=[v_1, \ldots, v_n] \quad (5)$$

where each of $u_1, \ldots, u_n$ and $v_1, \ldots, v_n$ is a column vector of n rows. G is an n-row, n-column diagonal matrix whose diagonal elements are $\gamma_1, \ldots, \gamma_n$.

c) Coding the n singular values $\gamma_1, \ldots, \gamma_n$ that have been obtained by the singular value decomposition.

d) Coding the 2n n-dimensional singular value vectors $u_1, \ldots, u_n$ and $v_1, \ldots, v_n$ that have also been obtained by the singular value decomposition.

In this example, since the power always concentrated in particular singular values, the coding can accommodate a positional deviation of statistical properties. Further, the number of items to be coded, $2n^2+n$, is smaller than the number $3n^2$ in the case where the number of classes is maximum in the Karhunen-Loève transform coding.

The singular value decomposition can be performed by determining eigenvalues and eigenvectors of $X^T X$ and $XX^T$ for the matrix X of a block consisting of n×n pixels. Since $X^T X$ and $XX^T$ are symmetric matrices, their eigenvalues and eigenvectors can be determined by a numerical calculation such as the Jacobi method. The amount of calculation for determining the matrices $XX^T$, $X^T X$, singular values $\gamma_1, \ldots, \gamma_n$, and singular vectors $u_1, \ldots, u_n$ and $v_1, \ldots, v_n$ is on the order of $2(n^3+\alpha)$ for each block. In the following, the amount of calculation is estimated in terms of the number of times of multiplications and additions. The above amount of calculation is larger than the amount of calculation, $2n^3$, of the orthogonal transform coding by $2\alpha$. This has been an obstruction to increasing the processing speed of a coding apparatus and decreasing its cost. The parameter $\alpha$ means an amount of convergence operations of the Jacobi method etc. For example, the amount of calculation of the Jacobi method varies depending on properties of the image block X, and is generally larger than that required for orthogonal transform. The parameter c is a ratio between the number of classes and the number of blocks.

Conventional methods of coding singular vectors include a method in which the elements of a singular vector are simply subjected to differential pulse coding modulation (DPCM), as in reference (1). Another example of coding singular vectors is described in N. Garguir, "Comparative Performance of SVD and Adaptive Cosine Transform in Coding Images," IEEE Transactions on Communications, Vol. COM-27, No. 8, pp. 1230–1234, August 1979 (referred to reference (2) below). In this method, the respective elements of a singular vector are normalized, then quantized by a Max quantizer, and finally transmitted in the form of fixed-length codes. The Max quantizer is described in J. Max, "Quantizing for Minimum Distortion," IEEE Trans. Inform. Theory, Vol. IT-6, No. 1, pp. 7–12, January 1960.

However, either method has a problem that singular vectors are not coded efficiently. The paper (in Japanese; referred to as reference (3) below) by Komatsu et al. entitled "Vector Quantization of Picture Signals by Singular Value Decomposition" in Shingakugiho, IE85-6, June 1985 discloses the use of vector quantization for effective coding of singular vectors. This method is still problematic in that the amount of calculation for vector quantization is large.

Conventional techniques of coding singular values described in literatures are only theoretical, and do not present any specific implementations in a coding apparatus.

As exemplified by references (2) and (3), there are conventional techniques of coding singular values and singular vectors in which the number of singular value and singular vector items to be transmitted is switched adaptively on a block-by-block basis in accordance with a positional variation of statistical properties of an image, and additional information indicating the number of items to be transmitted is also transmitted. In this case, although the image information itself is coded efficiently, the additional information is an obstruction to the improvement of the coding efficiency.

In the singular value decomposition coding method, the number of scalars of singular values and singular vectors to be coded and transmitted is $2n^2+n$. This number is more than twice the number $n^2$ of transform coefficients to be coded in the orthogonal transform coding method. This has been an obstruction to the improvement of the coding efficiency in the singular value decomposition coding method.

SUMMARY OF THE INVENTION

An object of the present invention is to reduce the amount of calculation in the singular value decomposition image coding.

Another object of the invention is to decrease the amount of calculation in the case where the efficiency of coding singular values and singular vectors is improved in the singular value decomposition image coding.

Another object of the invention is to reduce the number of items to be coded and transmitted in the singular value decomposition image coding.

A coding apparatus according to a first aspect of the invention is intended to reduce the amount of calculation in the coding. In this apparatus, instead of determining both orthonormal matrices U and V independently by a numerical calculation such as the Jacobi method, singular values $\gamma_1, \ldots, \gamma_n$ and singular vectors of either one of those matrices, for instance, $v_1, \ldots, v_n$ are determined by a numerical calculation, and then singular vectors $u_1, \ldots, u_n$ of the other matrix are analytically determined according to the following equation:

$$U^T = [Xv_1/\gamma_1, \ldots, Xv_n/\gamma_n] \quad (6)$$

The conceptual constitution will be described below with reference to FIG. 1.

The coding apparatus according to the first aspect comprises:

image dividing means 11 for dividing an image 1 into blocks X each consisting of n×n pixels;

$X^TX$ calculating means 12 for calculating $X^TX$;

singular values/singular vectors calculating means 13 for calculating singular values $\gamma_1, \ldots, \gamma_n$ of X and eigenvectors of $X^TX$, i.e., singular vectors of X, $v_1, \ldots, v_n$;

singular vectors calculating means 14 for calculating eigenvectors of $XX^T$, i.e., singular vectors of X, $u_1, \ldots u_n$; and singular values/singular vectors coding means 15 for coding the singular values $\gamma_1, \ldots, \gamma_n$ and the singular vectors $u_1, \ldots, u_n$ and $v_1, \ldots, v_n$.

In the image dividing means 11, the image 1 is divided into blocks each of which consists of n×n pixels, i.e., is represented by an n-row, n-column matrix X.

An operation performed for every block will be described. In the $X^TX$ calculating means 12, a matrix product $X^TX$ of X and its transpose $X^T$ is calculated. In the singular values/singular vectors calculating means 13, singular values of X, i.e., positive square roots of eigenvalues of $X^TX$, $\gamma_1, \ldots, \gamma_n$ (denoted by reference numeral 4 in FIG. 1), and eigenvectors of $X^TX$, i.e., singular vectors of X, $v_1, \ldots, v_n$ (denoted by reference numeral 6 in FIG. 1) are calculated by the Jacobi method etc. In the singular vectors calculating means 14, eigenvectors of $XX^T$, i.e., singular vectors of X, $u_1, \ldots, u_n$ (denoted by reference numeral 5 in FIG. 1) are calculated according to Equation (6) using the values of X, $\gamma_1, \ldots, \gamma_n$ and $v_1, \ldots, v_n$. The singular values/singular vectors coding means 15 codes the singular values $\gamma_1, \ldots, \gamma_n$, singular vectors $u_1, \ldots, u_n$ and $v_1, \ldots, v_n$ to output coded data 7.

A coding apparatus according to a second aspect of the invention is intended to reduce the amount of calculation. Instead of calculating all the singular values $\gamma_1, \ldots, \gamma_n$ and singular vectors $v_1, \ldots, v_n$ for $X^TX$ by a numerical calculation such as the Jacobi method to realize singular value decomposition, singular values, corresponding singular vectors, and an accumulated power of the singular values are successively calculated in the descending order of absolute values of the singular values. The singular value decomposition is finished when the accumulated power reaches a threshold. The conceptual constitution will be described below with reference to FIG. 2.

The coding apparatus according to the second aspect comprises:

image dividing means 11 for dividing an image 1 into blocks X each consisting of n×n pixels;

$X^TX$ calculating means 12 for calculating $X^TX$;

singular values/singular vectors successively calculating means 31 for calculating a singular value $\gamma_k$ and a corresponding singular vector $v_k$ in the descending order of magnitudes of singular values starting from the largest singular value $\gamma_1$ of X and corresponding singular vector $v_1$;

singular vectors successively calculating means 32 for successively calculating an eigenvector of $XX^T$, i.e., a singular vector of X, $u_k$ (k=1, ...) according to an equation $$u_k = Xv_k/\gamma_k \quad (7)$$

using X and the successively calculated $\gamma_k$ and $v_k$;

power accumulating means 33 for adding a power of the newly calculated singular value $\gamma_k$ to powers of the previously calculated singular values to produce an accumulated power, and for finishing a singular value decomposing operation with a singular value $\gamma_m$, and singular vectors $u_m$ and $v_m$ when the accumulated power has reached a preset threshold, when a ratio of the accumulated power to a power of X has reached a preset ratio, or when a difference between the accumulated power and the power of X has reached a preset threshold; and singular values/singular vectors coding means 15 for coding the singular values $\gamma, \ldots, \gamma_m$ and the singular vectors $u_1, \ldots, u_m$ and $v_1, \ldots, v_m$.

In the image dividing means 11, the image 1 is divided into blocks each of which consists of n×n pixels, i.e., is represented by an n-row, n-column matrix X.

An operation performed for every block will be described. In the $X^T X$ calculating means 12, a matrix product $X^T X$ of X and its transpose $X^T$ is calculated. In the singular values/singular vectors successively calculating means 31, first the largest one of singular values of X, i.e., positive square roots of eigenvalues of $X^T X$ and a corresponding singular vector $v_1$ are calculated, and then a singular value $\gamma_k$ and a corresponding singular vector $v_k$ are calculated by the power method etc. in the descending order of magnitudes of singular values. In the singular vectors successively calculating means 32, an eigenvector of $XX^T$, i.e., a singular vector of X, $u_k$ (k=1, . . . ) is successively calculated according to Equation (7) using X and $\gamma_k$ and $v_k$. In the power accumulating means 33, a power of the newly calculated singular value $\gamma_k$ is added to powers of the previously calculated singular values to produce an accumulated power. When the accumulated power has reached a preset threshold, when a ratio of the accumulated power to a power of X has reached a preset ratio, or when a difference between the accumulated power and the power of X has reached a preset threshold, the power accumulating means 33 supplies an operation end instructing signal 37 to the singular values/singular vectors successively calculating means 31 and the singular vectors successively calculating means 32 to finish the operations of those means with the singular value $\gamma_m$ and the singular vectors $u_m$ and $v_m$. In the singular values/singular vectors coding means 15, the singular values $\gamma, \ldots, \gamma_m$ and the singular vectors $u_1, \ldots, u_m$ and $v_1, \ldots, v_m$ are coded.

A coding apparatus according to a third aspect of the invention is intended to improve the coding efficiency of singular values and singular vectors, and to simplify coding and decoding apparatuses. To this end, singular values are subjected to dynamic range adaptive linear quantization. Further, singular vectors are classified, and adaptive linear quantization is performed with step widths that are in accordance with the respective classes. The conceptual constitution will be described below with reference to FIG. 3.

The coding apparatus according to the third aspect comprises:

image dividing means 11 for dividing an image 1 into blocks X each consisting of n×n pixels;

singular value decomposing means 91 for singular value decomposing X to determine singular values $\gamma_1, \ldots, \gamma_n$ and singular vectors $u_1, \ldots, u_n$ and $v_1, \ldots, v_n$;

singular value vs. thresholds comparing means 921 for grouping the singular values $\gamma_k$ into classes having respective predetermined dynamic ranges by comparing the singular values $\gamma_k$ with predetermined thresholds;

number of singular values coding means 922 for coding the number of singular values of each class;

singular values adaptive quantizing means 923 for linearly quantizing the singular values $\gamma_k$ belonging to the same class adaptively in accordance with the dynamic range of the class to produce quantized indices;

singular values coding means 924 for coding the quantized indices;

difference between elements calculating means 931 for calculating differences between elements of each of the singular vectors $u_1, \ldots, u_n$ and the singular vectors $v_1, \ldots, v_n$;

difference between elements classifying means 932 for classifying the differences between elements in accordance with their magnitudes by using predetermined thresholds;

difference between elements adaptive quantizing means 933 for linearly quantizing the differences between elements by adapting a step width to a class to which each difference between elements belongs, to produce quantized indices;

singular vectors coding means 934 for coding the classes of the differences between elements and the quantized indices; and codes multiplexing means 94 for multiplexing coded data.

In the image dividing means 11, the image 1 is divided into blocks each of which consists of n×n pixels, i.e., is represented by an n-row, n-column matrix X.

An operation performed for every block will be described. In the singular value decomposing means 91, X is singular value decomposed X to determine singular values $\gamma_1, \ldots, \gamma_n$ and singular vectors $u_1, \ldots, u_n$ and $v_1, \ldots, v_n$. In the singular value vs. thresholds comparing means 921, the singular values $\gamma_k$ are grouped into classes having respective predetermined dynamic ranges in accordance with magnitudes of the singular values $\gamma_k$. In the number of singular values coding means 922, the number of singular values of each class is coded. In the singular values adaptive quantizing means 923 the singular values $\gamma_k$ belonging to the same class are linearly quantized adaptively in accordance with the dynamic range of the class to produce quantized indices. In the singular values coding means 924 the quantized indices are coded in the descending order of their magnitudes. In the difference between elements calculating means 931, differences between elements of each of the singular vectors $u_1, \ldots, u_n$ and the singular vectors $v_1, \ldots, v_n$ are calculated. In the difference between elements classifying means 932 the differences between elements are classified in accordance with their magnitudes by comparison with predetermined thresholds. In the difference between elements adaptive quantizing means 933, each difference between elements is linearly quantized in an adaptive manner with a step width that is in accordance with a class to which the difference between elements belongs, to produce quantized index. In the singular vectors coding means 934, the classes of the differences between elements and the quantized indices are coded. In this case, the singular vectors are coded in the descending order of magnitudes of the corresponding singular values. In the codes multiplexing means 94, the codes as output from the number of singular values coding means 922, the singular values coding means 924 and the singular vectors coding means 934 are multiplexed.

The conceptual constitution of coding and decoding apparatuses according to a fourth aspect of the invention will be described below with reference to FIGS. 7 and 8.

To reduce the amount of symbols to be coded, the coding apparatus according to the fourth aspect comprises:

image dividing means 11 for dividing an image 1 into blocks X each consisting of n×n pixels;

singular values/singular vectors calculating means 52 for calculating singular values of X, $\gamma_1, \ldots, \gamma_n$ (denoted by reference numeral 4 in FIG. 7) and singular vectors $u_1, \ldots, u_n$ and $v_1, \ldots, v_n$ (denoted by reference numeral 54 in FIG. 7);

singular vector elements reducing means 53 for reducing the number of elements of each of the singular vectors $u_1, \ldots, u_n$ and $v_n, \ldots, v_n$ from n to n–k (k=1, ..., n), and for determining magnitude of solution information indicating which one (larger or smaller one) of the two solutions a removed element is (when n–k elements are removed, each of 2n elements has two solutions);

singular values/singular vectors coding means 56 for coding the singular values $\gamma_1, \ldots, \gamma_n$, elements-reduced singular vectors $u_1', \ldots, u_n'$ and $v_1', \ldots, v_n'$ and the 2n pieces of magnitude of solution information.

The decoding apparatus according to the fourth aspect comprises:

singular values/singular vectors decoding means 69 for decoding singular values $\gamma_k$, elements-reduced singular vectors $u_k'$ and $v_k'$ and 2n pieces of magnitude of solution information (k=1, ..., n);

singular vectors extrapolating means 63 for determining singular vectors $u_k$ and $v_k$ by calculating non-coded elements based on n–k elements of each of the elements-reduced singular vectors $u_k'$ and $v_k'$ and the 2n pieces of magnitude of solution information utilizing the fact that each of a matrix U consisting of $u_k$ and a matrix V consisting of $v_k$ is an orthonormal matrix;

singular values/singular vectors combining means 62 for restoring a block X from the decoded singular values $\gamma_k$ and singular vectors $u_k$ and $v_k$; and image synthesizing means 67 for restoring an image by combining the blocks X.

Alternatively, to reduce the amount of calculation of the above-described coding and decoding apparatus, the above singular vector elements reducing means 53, singular values/singular vectors coding means 56, singular vectors extrapolating means 63 and singular values/singular vectors decoding means 69 may be constructed as follows.

That is, there are provided:

singular vector elements reducing means 53 for reducing the number of elements of each of the singular vectors $u_1, \ldots, u_n$ and $v_1, \ldots, v_n$ from n to n–k+1 (k=1, ..., n);

singular values/singular vectors coding means 56 for coding the singular values $\gamma_1, \ldots, \gamma_n$ and elements-reduced singular vectors $u_1', \ldots, u_n'$ and $v_1', \ldots, v_n'$;

singular values/singular vectors decoding means 69 for decoding singular values $\gamma_k$ and elements-reduced singular vectors $u_k'$ and $v_k'$ (k=1, ..., n); and singular vectors extrapolating means 63 for determining singular vectors $u_k$ and $v_k$ by calculating non-coded elements based on n–k+1 elements of each of the elements-reduced singular vectors $u_k'$ and $v_k'$ utilizing the fact that each of a matrix U consisting of $u_k$ and a matrix V consisting of $v_k$ is an orthonormal matrix.

In the image dividing means 11, an image 1 is divided into blocks each of which consists of n×n pixels, i.e., is represented by an n-row, n-column matrix X.

An operation performed for every block will be described below.

In the singular values/singular vectors calculating means 52, X is singular value decomposed to produce singular values of X, $\gamma_1, \ldots, \gamma_n$ and singular vectors $u_1, \ldots, u_n$ and $v_1, \ldots, v_n$. In the singular vector elements reducing means 53, singular vectors $u_k'$ and $v_k'$ are obtained by reducing, by k, the number of elements of each of the singular vectors $u_k$ and $v_k$ (k=1, ..., n). Elements-reduced singular vectors $u_k'$ and $v_k'$ and the singular values $\gamma_1, \ldots, \gamma_n$ are coded in the singular values/singular vectors coding means 56.

In the decoding operation, in the singular vectors extrapolating means 63, singular vectors $u_k$ and $v_k$ are determined by calculating non-coded elements based on n–k elements of each of the elements-reduced singular vectors $u_k'$ and $v_k'$ according to the following equations utilizing the fact that each of a matrix U consisting of $u_k$ and a matrix V consisting of $v_k$ is an orthonormal matrix:

$$|u_k|^2 = 1 \quad (k=1, \ldots, n) \tag{8}$$

$$|v_k|^2 = 1 \quad (k=1, \ldots, n) \tag{9}$$

$$u_i \cdot u_j = 0 \quad (i \neq j) \tag{10}$$

$$v_i \cdot v_j = 0 \quad (i \neq j) \tag{11}$$

In the above equations, $|u_k|$ represents the absolute value of $u_k$, and $u_i \cdot u_j$ means the inner product of $u_i$ and $u_j$.

Since each of Equations (8) and (9) is a quadratic equation, it has two solutions. The singular vector elements reducing means 53 determines magnitude of solution information indicating which one (larger or smaller one) of the two solutions a removed element is. The singular values/singular vectors coding means 56 also codes the magnitude of solution information. The singular vectors extrapolating means 63 also utilizes the magnitude of solution information.

In the singular values/singular vectors combining means 62, X is synthesized according to Equation (3) using the singular values $\gamma_1, \ldots, \gamma_n$ and the singular vectors $u_1, \ldots, u_n$ and $v_1, \ldots, v_n$. Referring to Equation (3), n-row, n-column orthonormal matrices U and V are such that $$U^T = [u_1, \ldots, u_n]$$

$$V^T = [v_1, \ldots, v_n]$$

where each of $u_1, \ldots, u_n$ and $v_1, \ldots, v_n$ is an n-row column vector. G is an n-row, n-column diagonal matrix having diagonal elements $\gamma_1, \ldots, \gamma_n$.

Alternatively, in the singular values/singular vectors calculating means 52, X is singular value decomposed to produce singular values of X, $\gamma_1, \ldots, \gamma_n$ and singular vectors $u_1, \ldots, u_n$ and $v_1, \ldots, v_n$. In the singular vector elements reducing means 53, singular vectors $u_k'$ and $v_k'$ are obtained by removing k–1 elements from each of the singular vectors $u_k$ and $v_k$ (k=1, ..., n). The elements-reduced singular vectors $u_k'$ and $v_k'$ and the singular values $\gamma_1, \ldots, \gamma_n$ are coded in the singular values/singular vectors coding means 56.

In the decoding operation, in the singular vectors extrapolating means 63, in the singular vectors extrapolating means 63, singular vectors $u_k$ and $v_k$ are determined by calculating non-coded elements based on n–k+1 elements of each of the elements-reduced singular vectors $u_k'$ and $v_k'$ according to Equations (10) and (11) utilizing the fact that each of a matrix U consisting of $u_k$ and a matrix V consisting of $v_k$ is an orthonormal matrix.

BRIEF DESCRIPTION OF THE DRAWINGS

FIG. 9 is a block diagram showing a configuration of a coding apparatus according to a fourth embodiment of the invention; and FIG. 10 is a block diagram showing a configuration of a decoding apparatus according to the fourth embodiment of the invention.

DESCRIPTION OF THE PREFERRED EMBODIMENTS

Embodiment 1

Figure 4:
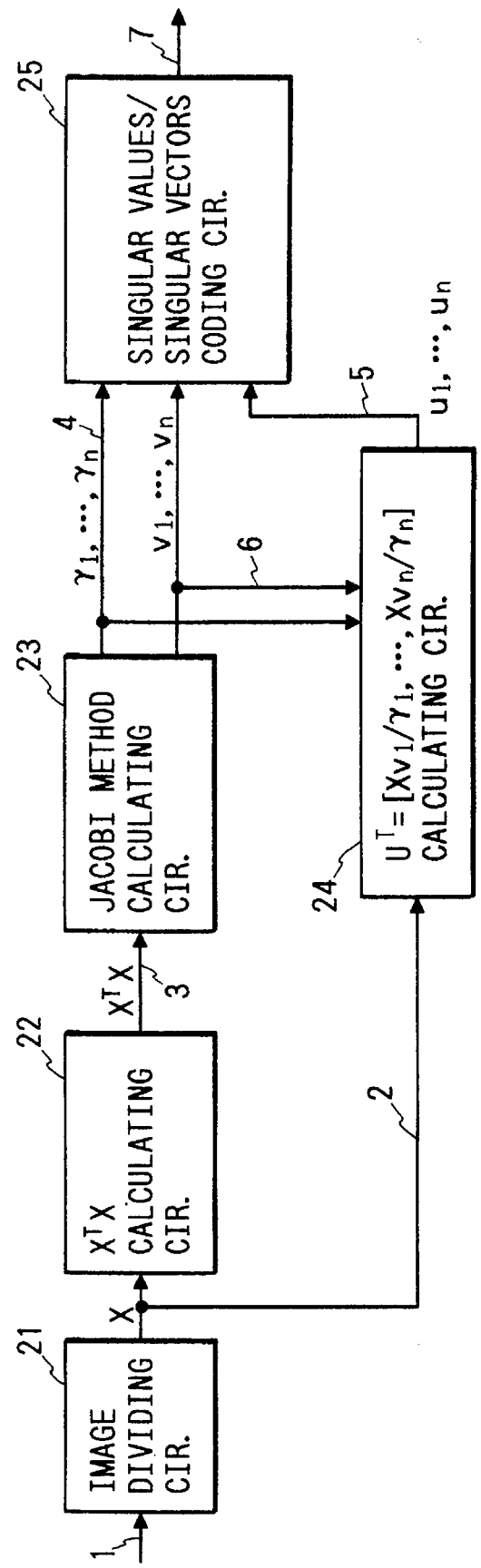
FIG. 4 is a block diagram showing a configuration of a coding apparatus according to a first embodiment of the invention.

Referring to FIG. 4, a configuration of a coding apparatus according to a first embodiment of the present invention will be described. The coding apparatus includes an image dividing circuit 21 for dividing an image 1 into blocks X each consisting of n×n pixels; an $X^TX$ calculating circuit 22 for calculating $X^TX$, a Jacobi method calculating circuit 23 for calculating singular values of X, $\gamma_1, \ldots, \gamma_n$ and singular vectors $v_1, \ldots, v_n$ by the Jacobi method; a $U^T=[Xv_1/\gamma_1, \ldots, Xv_n/\gamma_n]$ calculating circuit 24 for calculating singular vectors $u_1, \ldots, u_n$ according to Equation (6) using X, $\gamma_1, \ldots, \gamma_n$ and $v_1, \ldots, v_n$; and a singular values/singular vectors coding circuit 25 for Huffman coding the singular values $\gamma_1, \ldots, \gamma_n$ and the singular vectors $u_1, \ldots, u_n$ and $v_1, \ldots, v_n$.

The operation of the above coding apparatus will be described. First, the image 1 is divided by the image dividing means 21 into blocks each of which consists of n×n pixels, i.e., is represented by n-row, n-column matrix X.

An operation to be performed on one block will be described below.

In the $X^{TX}$ calculating circuit 22, a matrix product $X^TX$ of X and its transpose is calculated. In the Jacobi method calculating circuit 23, eigenvalues of $X^TX$, i.e., singular values of X, $\gamma_1, \ldots, \gamma_n$ and eigenvectors of $X^TX$, i.e., singular vectors of X, $v_1, \ldots, v_n$ are calculated by the Jacobi method.

The Jacobi method will be explained. $A^{(k)}$ is assumed to be a real symmetric matrix. The parenthesized variable k in the superscript represents the number of repetitions, and has an initial value k=1. Multiplying $A^{(k)}$ by $P^{(k)}$ from the left and by its transpose $(P^{(k)})^T$, $$A^{(k+1)}=P^{(k)}A^{(k)}(P^{(k)})^T \quad (12)$$

is obtained. $A^{(k+1)}$ is also a real symmetric matrix. $A^{(k+1)}$ and $A^{(k)}$ have the same eigenvalue, and the Ith-row, Jth-column element and the Jth-row, Ith-column element of $A^{(k+1)}$ are 0. That is, $$aIJ^{(k+1)}=0 \quad (13)$$

In Equation (8), if the Ith-row, Jth-column element of $P^{(k)}$ is represented by $pIJ^{(k)}$, $$pII^{(k)}=pJJ^{(k)}=\cos\theta.$$

The other diagonal elements are 1.

$$pIJ^{(k)}=-pJI^{(k)}=\sin\theta.$$

The other non-diagonal elements are 0. Further, $$\theta=(\frac{1}{2})\tan^{-1}\{2aIJ/(aII-aJJ)\}.$$

If aII=aJJ, $$\theta=\pi/4.$$

By making the absolute values of the non-diagonal elements of $A^{(k)}$ sufficiently small by repeating the above conversion, approximated values $\alpha_{11}, \ldots, \alpha_{nn}$ of eigenvalues occupy the diagonal. If a product of $P^{(k)}$'s at the respective repetition stages (m: number of repetitions)

$$P=P^{(m)} \ldots P^{(1)} \quad (14)$$

is produced, the first, second, ..., nth rows of its transpose $P^T$ are eigenvectors $q_1, \ldots, q_n$ corresponding to respective eigenvalues $\alpha_{11}, \ldots, \alpha_{nn}$.

Actual calculation of $P^T$ may be performed such that $$Q^{(k+1)}=I \quad (15)$$

is first calculated (I: unit matrix), and $$Q^{(k+1)}=Q^{(k)}(P^{(k)})^T \quad (16)$$

is calculated every repetition.

Utilizing the above explanation of the Jacobi method, the operation of the Jacobi method calculating circuit 23 will be described in detail. In the Jacobi method calculating circuit 23, a Jacobi method calculation is performed with $X^TX$ employed as $A^{(1)}$. Using the resulting eigenvalues $\alpha_{11}, \ldots, \alpha_{nn}$, singular values are calculated such that $$\gamma_1=(\alpha_{11})^{1/2}, \ldots, \gamma_n=(\alpha_{nn})^{1/2}. \quad (17)$$

The eigenvectors $q_1, \ldots, q_n$ themselves obtained by the Jacobi method calculation are employed as singular vectors $v_1, \ldots, v_n$.

In the $U^T=[Xv_1/\gamma_1, \ldots, Xv_n/\gamma_n]$ calculating circuit 24, eigenvectors $u_1, \ldots, u_n$ of $XX^T$ are analytically calculated according to Equation (6) using X, $\gamma_1, \ldots, \gamma_n$ and $v_1, \ldots, v_n$.

In the singular values/singular vectors coding circuit 25, the singular values $\gamma_1, \ldots, \gamma_n$ and the singular vectors $u_1, \ldots, u_n$ and $v_1, \ldots, v_n$ are Huffman coded.

Thus, the coding operation on one block is completed. This one-block operation is performed on every block of the image 1.

Although in the above description of the first embodiment the eigenvectors of $X^TX$, i.e., singular vectors of X, $v_1, \ldots$ , $v_n$ are calculated by the Jacobi method and then the eigenvectors of $XX^T$, $u_1, \ldots, u_n$ are calculated analytically, it is apparent that $v_1, \ldots, v_n$ and $u_1, \ldots, u_n$ can be obtained in the reverse order in the similar manner by using the similar means.

Although in the above description of the first embodiment the eigenvalues and eigenvectors of a real symmetric matrix are calculated by the Jacobi method, they may be calculated by other methods such as the power method.

Although in the above description of the first embodiment the singular values and singular vectors are coded by the Huffman coding, the coding method is not limited to it.

Embodiment 2

Figure 5:
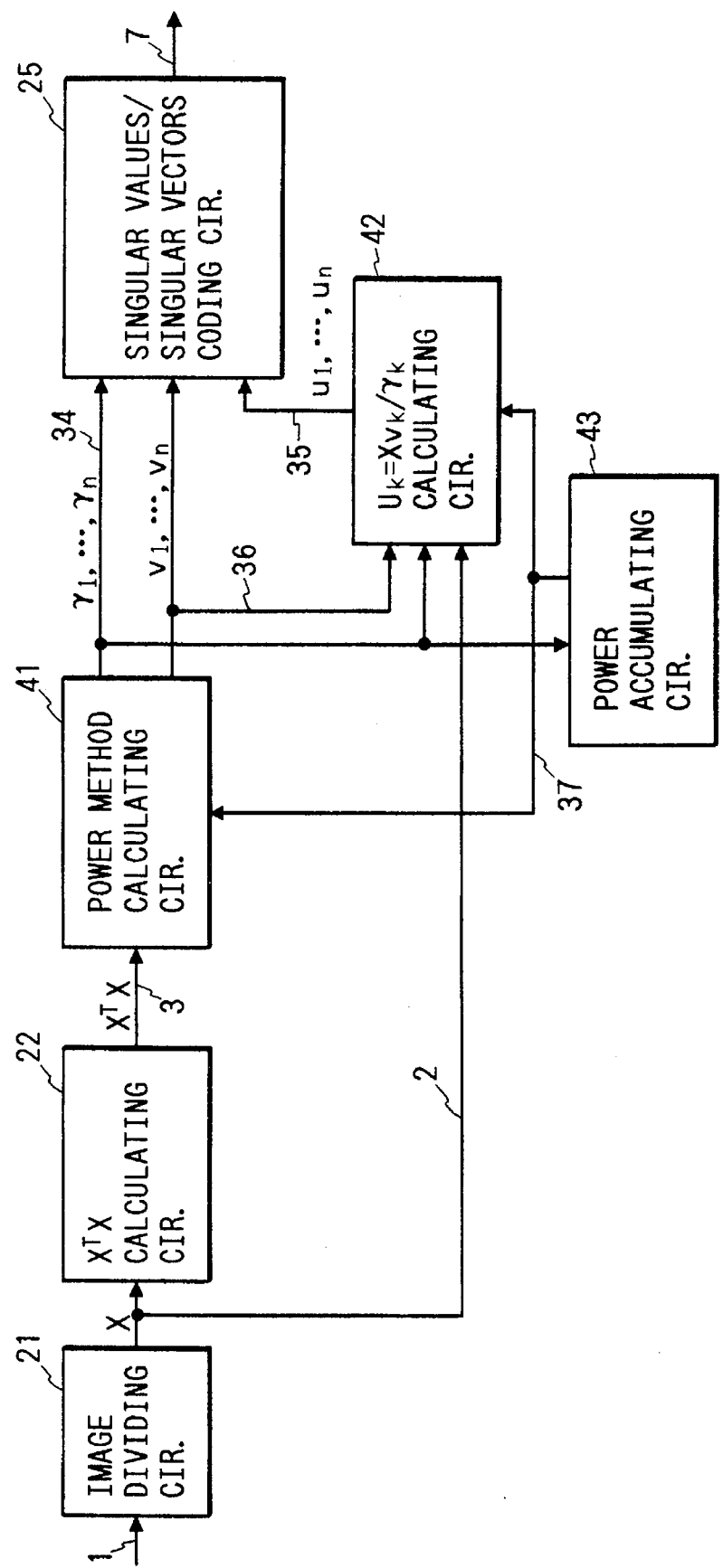
FIG. 5 is a block diagram showing a configuration of a coding apparatus according to a second embodiment of the invention.

Referring to FIG. 5, a configuration of a coding apparatus according to a second embodiment of the invention will be described. The coding apparatus includes an image dividing circuit 21 for dividing an image 1 into blocks X each consisting of n×n pixels; an $X^TX$ calculating circuit 22 for calculating $X^TX$; a power method calculating circuit 41 for first calculating, by the power method, a singular value $\gamma_1$ corresponding to the largest eigenvalue of $X^TX$ and a singular vector $v_1$ corresponding to $\gamma_1$, and then successively calculating singular values $\gamma_k$ and singular vectors $v_k$ (k=1, ...) in the descending order of magnitudes of singular values; a $u_k = Xv_k/\gamma_k$ calculating circuit 42 for successively calculating eigenvectors of $XX^T$, i.e., singular vectors of X, $u_k$ according to Equation (7) using X and the successively calculated $\gamma_k$ and $v_k$; a power accumulating circuit 43 for adding a power of the newly calculated singular value $\gamma_k$ to powers of the previously calculated singular values to produce an accumulated power, and for finishing the operations of the power method calculating circuit 41 and the $u_k = Xv_k/\gamma_k$ calculating circuit 42 with a singular value $\gamma_m$ and singular vectors $u_m$ and $v_m$ when the accumulated power has reached a preset threshold; and a singular values/singular vectors coding circuit 25 for coding the singular values $\gamma_1, \ldots, \gamma_m$ and the singular vectors $u_1, \ldots, u_m$ and $v_1, \ldots, v_m$.

The operation of the above coding apparatus will be described. In the image dividing circuit 21, the image 1 is divided into blocks each of which consists of n×n pixels, i.e., is represented by n-row, n-column matrix X.

An operation performed on one block will be described below.

In the $X^TX$ calculating circuit 22, a matrix product $X^TX$ of X and its transpose is calculated. In the power method calculating circuit 41, first a singular value $\gamma_1$ corresponding to the largest eigenvalue of $X^TX$ and a singular vector $v_1$ corresponding to $\gamma_1$ are calculated, and then singular values $\gamma_k$ and corresponding singular vectors $v_k$ are successively calculated by the power method in the descending order of magnitudes of singular values.

The power method will be explained. In the case of determining an eigenvalue $\gamma_1$ having the largest absolute value of an n-row, n-column matrix $A^{(1)}$ and a corresponding eigenvector $w_1$, if an arbitrary (but $z^{(0)} \neq 0$) initial vector, i.e., an n-row column vector $z^{(0)}$ is selected and a vector sequence $$z^{(0)}, \ldots, z^{(i)}, \ldots$$

is produced according to $$z^{(i+1)} = A^{(1)} z^{(i)} \tag{18}$$

where i=0, 1, 2, ..., the ratio among elements, i.e., the direction of vectors converges to $w_1$.

An eigenvalue $\lambda_1$ is determined from the eigenvector $w_1$ thus obtained by calculated a Rayleigh quotient such that $$\lambda_1 = z^{(i)} \cdot z^{(i+1)} / (z^{(i)} \cdot z^{(i)}). \tag{19}$$

Then, to determine an eigenvector $w_k$ (k=2, ..., n) corresponding to an eigenvalue $\lambda_k$ having the kth largest absolute value, the above power method may be applied to $A^{(k)}$ defined as follows:

$$A(k) = A^{(k-1)} - \{\lambda_{k-1}/(w_{k-1} \cdot w_{k-1})\} w_{k-1} w_{k-1}^T \tag{20}$$

Utilizing the above explanation of the power method, the operation of the power method calculating circuit 41 will be described in detail. In the power method calculating circuit 41, a singular value $\gamma_1$ having the largest absolute value is calculated by the power method with $X^TX$ employed as $A^{(1)}$. Similarly, the kth largest singular value is calculated by the power method after $A^{(k)}$ is set according to Equation (16). A singular value $\gamma_k$ is calculated according to $$\gamma_k = (\lambda_k)^{1/2} \tag{21}$$

using the eigenvalue $\lambda_k$ thus obtained. A singular vector $v_k$ is calculated from $w_k$ by the following normalization:

$$v_k = w_k/|w_k| \tag{22}$$

In the $u_k = Xv_k/\gamma_k$ calculating circuit 42, singular vectors $u_k$ (k=1, ...) are successively calculated according to Equation (7) using X, $\gamma_k$ and $v_k$.

In the power accumulating circuit 43, every time the new singular value $\gamma_k$ is calculated successively, its power, i.e., $\lambda_k$ is added to the powers of the previously calculated singular values to produce an accumulated power. When the accumulated power has reached a preset threshold, the operations of the power method calculating circuit 41 and the $u_k = Xv_k/\gamma_k$ calculating circuit 42 are finished with a singular value $\gamma_m$ and singular vectors $u_m$ and $v_m$.

In the singular values/singular vectors coding circuit 25, the singular values $\gamma_1, \ldots, \gamma_m$ and the singular vectors $u_1, \ldots, u_m$ and $v_1, \ldots, v_m$ are Huffman coded.

This one-block operation is performed on every block of the image 1.

Although in the above description of the second embodiment the eigenvalues and the eigenvectors of a real symmetric matrix are successively calculated by the power method, they may be calculated by other methods.

Although in the above description of the second embodiment the singular values and singular vectors are coded by the Huffman coding, the coding method is not limited to it.

Although in the above description of the second embodiment the preset threshold is used for the judgment on the accumulated power, a judgment may be made in the following manner. For example, a power of X is calculated, and a ratio of the accumulated power to the power of X is compared with a preset ratio, or a difference between the accumulated power and the power of X is compared with a preset threshold.

Embodiment 3

Figure 6:
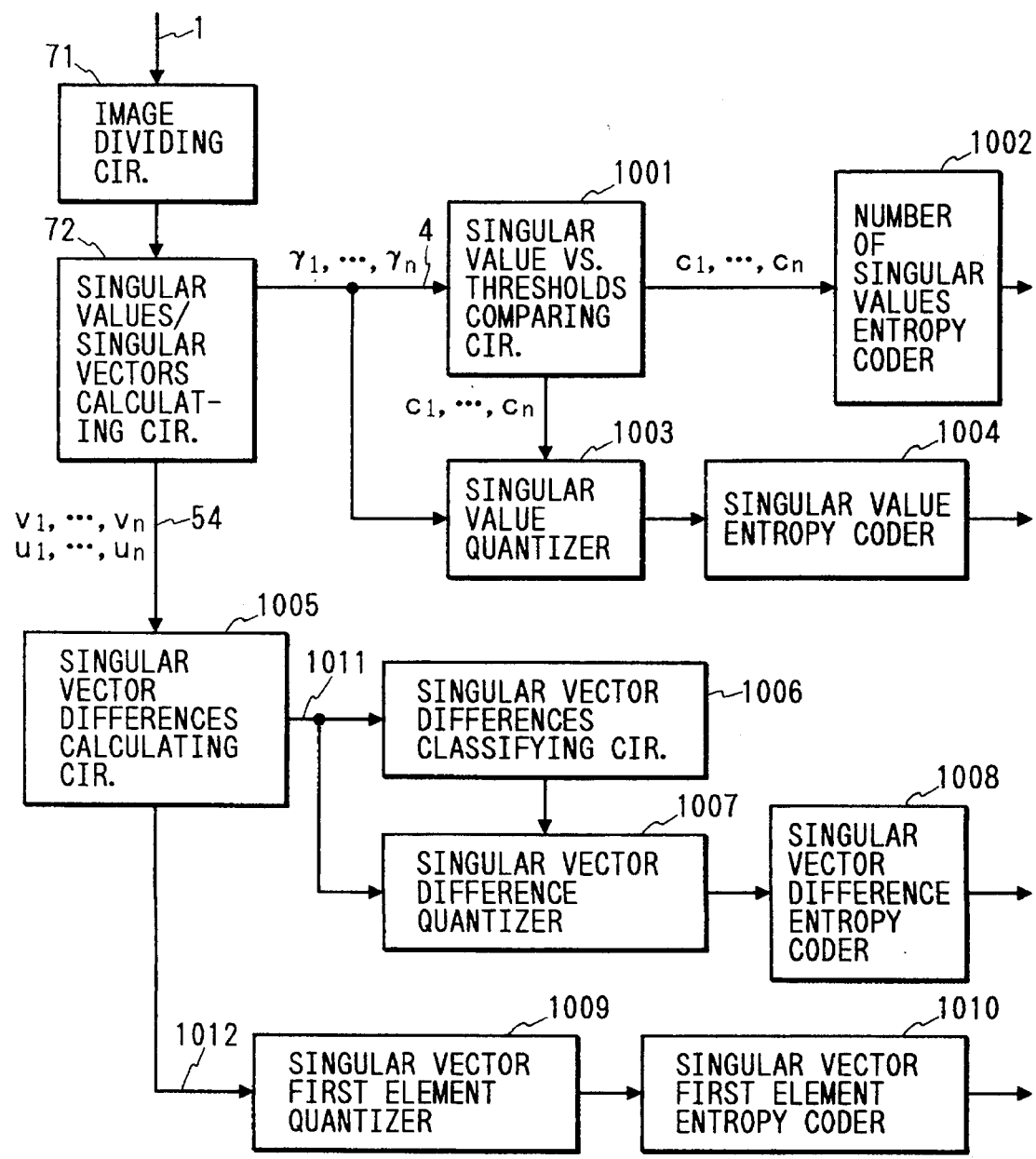
FIG. 6 is a block diagram showing a configuration of a coding apparatus according to a third embodiment of the invention.
Figure 7:
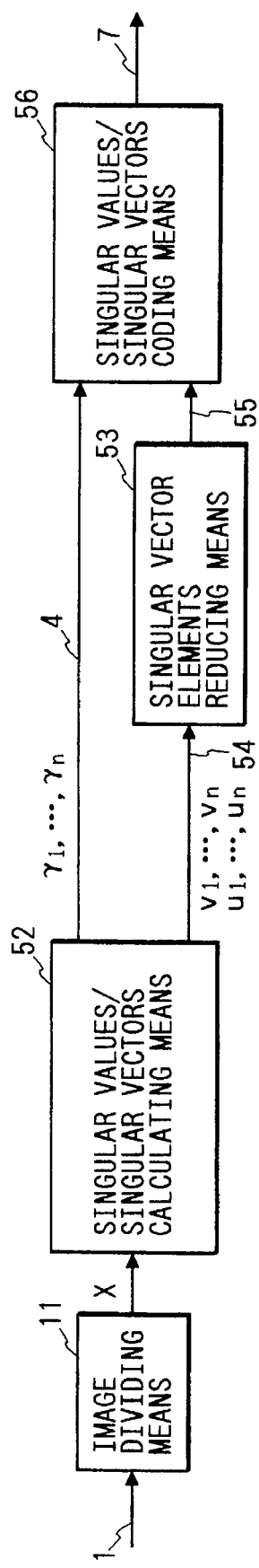
FIG. 7 is a block diagram showing conceptual constitution of a coding apparatus according to a fourth aspect of the invention.
Figure 8:
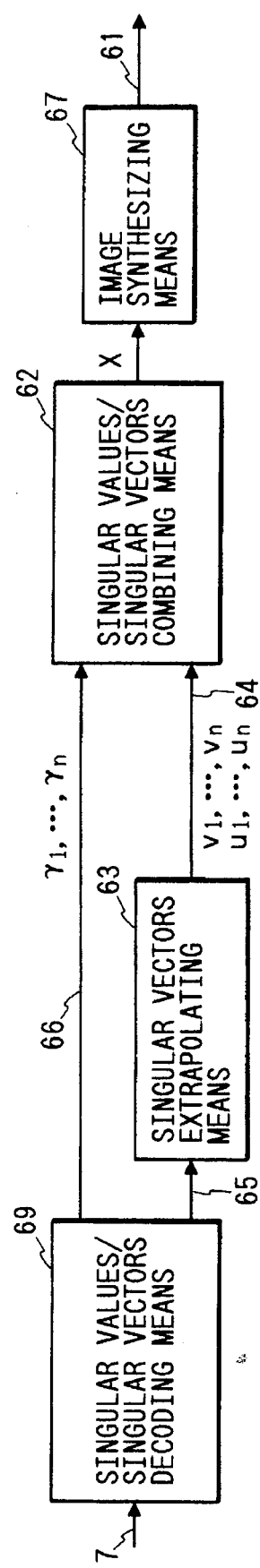
FIG. 8 is a block diagram showing conceptual constitution of a decoding apparatus according to the fourth aspect of the invention.

Referring to FIG. 6, a configuration of a coding apparatus according to a third embodiment of the invention will be described. The coding apparatus includes an image dividing circuit 71 for dividing an image 1 into blocks X each consisting of n×n pixels; a singular values/singular vectors calculating circuit 72 for calculating singular values $\gamma_1, \ldots, \gamma_n$ and singular vectors $u_1, \ldots, u_n$ and $v_1, \ldots, v_n$; a singular value vs. thresholds comparing circuit 1001 for classifying the singular values by comparing those with predetermined thresholds; a number of singular values entropy coder 1002 for entropy coding the number of singular values; a singular value quantizer 1003 for quantizing the singular values; a singular values entropy coder 1004 for entropy coding the singular values; a singular vector differences calculating circuit 1005 for calculating differences between elements of singular vectors; a singular vector differences classifying circuit 1006 for classifying the singular vector differences by comparing those with thresholds; a singular vector difference quantizer 1007 for quantizing the singular vector differences; a singular vector difference entropy coder 1008 for entropy coding the singular vector differences; a singular vector first element quantizer 1009 for quantizing the first elements of the singular vectors; and a singular vector first element entropy coder 1010 for entropy coding the first elements of the singular vectors.

The operation of the above coding apparatus will be described.

In the singular value vs. thresholds comparing circuit 1001, singular values 4 are classified by being compared with predetermined thresholds $th_1, th_2, \ldots, th_{n-1}$ ($th_1 < th_2 < \ldots < th_{n-1}$). Further, $$th_0 = 0$$

$th_n$ = (theoretical maximum of singular values).

If a singular value $\gamma_k$ satisfies a condition $th_{m-1} \leq \gamma_k < th_m$, it is regarded as belonging to class m (m=1, ..., n). The numbers of singular values belonging to the respective classes are denoted by $c_1, c_2, \ldots, c_n$, which are entropy coded by the number of singular values entropy coder 1002.

Further, the singular values 4 are linearly quantized in the singular value quantizer 1003. It is assumed that the singular values 4 are quantized with a step width s. Since the singular values 4 are transmitted in the descending order of their magnitudes, their classes can be recognized by the numbers $c_1, c_2, \ldots, c_n$. A singular value belonging to class m coded with a length of $$\log_2\{(th_m - th_{m-1})/s\} \text{ [bits]}$$

where m=1, ..., n. Quantized singular values are entropy coded in the singular values entropy coder 1004.

For example, where n=16, the singular value vs. thresholds comparing circuit 1001 performs a classifying operation such that the number of singular values satisfying a condition $\gamma_k < 16/21$ is denoted by $c_1$, the number of singular values satisfying a condition $16/21 \leq \gamma_k < (16/21) \times 5$ is denoted by $c_2$, and the number of singular values satisfying a condition $\gamma_k \geq (16/21) \times 5$ is denoted by $c_3$.

In the number of singular values entropy coder 1002, $c_1$ is coded with a fixed length of 4 bits, $c_2$ is coded so as to be assigned codes shown in Table 1, and $c_3$ is coded so as to be assigned codes shown in Table 2.

TABLE 1

| $c_2$ | Code |
|---|---|
| 0 | 11 |
| 1 | 10 |
| 2 | 011 |
| 3 | 010 |
| 4 | 0011 |
| 5 | 0010 |
| 6 | 00011 |
| 7 | 00010 |
| ... | ... |

TABLE 2

| $c_3$ | Code |
|---|---|
| 1 | 1 |
| 0 | 01 |
| 2 | 001 |
| 3 | 0001 |
| ... | ... |

In the singular value quantizer 1003, with a quantizing step of 1/21, linear quantization is performed with the following bit allocation:

| | |
|---|---|
| $\gamma_k < 16/21$ | 4 bits |
| $16/21 \leq \gamma_k < (16/21) \times 5$ | 6 bits |
| $\gamma_k \geq (16/21) \times 5$ | 8 bits |

The maximum of the singular values is 16. Quantized singular values are entropy coded in the singular values entropy coder 1004.

On the other hand, to improve the coding efficiency of singular vectors, singular vectors are coded by the DPCM. The singular vectors are classified in accordance with singular vector differences.

A singular vector $u_k$ is expressed as $$u_k = (u_{k1}, u_{k2}, \ldots, u_{kn})$$

where k=1, ..., n. $u_{k1}$ is the first element of the singular vector $u_k$.

The singular vector differences calculating circuit 1005 sends first elements 1012 of the singular vectors to the singular vector first element quantizer 1009, where the first elements 1012 are linearly quantized. The quantized first elements are then entropy coded in the singular vector first element entropy coder 1010.

In the singular vector differences calculating circuit 1005, a calculation of $$u_{km} - u_{km-1}$$

where k=1, ..., n, m=2, ..., n, is performed, and resulting values 1011 are supplied to the singular vector differences classifying circuit 1006 and the singular vector difference quantizer 1007.

The singular vector differences classifying circuit 1006 classifies the singular vector differences. In the singular vector difference quantizer 1007, the singular vector differences are linearly quantized, for instance, with step widths shown in Table 3 (k=1) or Table 4 (k>1) for each class and k.

TABLE 3

| Absolute value of difference | Step width |
| --- | --- |
| Smaller than 0.07 | 0.01 |
| Not less than 0.07 and smaller than 0.37 | 0.02 |
| ... | ... |

TABLE 4

| Absolute value of difference | Step width |
| --- | --- |
| Smaller than 0.12 | 0.04 |
| Not less than 0.12 and smaller than 0.40 | 0.04 |
| ... | ... |

In this case, a relationship between representative values after the quantization and coding symbols are as shown in Table 5 (k=1).

TABLE 5

| (a) | | (b) | |
| --- | --- | --- | --- |
| Representative value | Coding symbol | Representative value | Coding symbol |
| Not less than 0.07 | $p_{16}^{(0)}$ | Not less than 0.37 | $p_{16}^{(1)}$ |
| 0.065 | $p_{15}^{(0)}$ | 0.36 | $p_{15}^{(1)}$ |
| 0.055 | $p_{14}^{(0)}$ | 0.34 | $p_{14}^{(1)}$ |
| 0.045 | $p_{13}^{(0)}$ | 0.32 | $p_{13}^{(1)}$ |
| 0.035 | $p_{12}^{(0)}$ | 0.30 | $p_{12}^{(1)}$ |
| 0.025 | $p_{11}^{(0)}$ | 0.28 | $p_{11}^{(1)}$ |
| 0.015 | $p_{10}^{(0)}$ | 0.26 | $p_{10}^{(1)}$ |
| 0.005 | $p_{9}^{(0)}$ | 0.24 | $p_{9}^{(1)}$ |
| −0.005 | $p_{8}^{(0)}$ | 0.22 | $p_{8}^{(1)}$ |
| −0.015 | $p_{7}^{(0)}$ | 0.20 | $p_{7}^{(1)}$ |
| −0.025 | $p_{6}^{(0)}$ | 0.18 | $p_{6}^{(1)}$ |
| −0.035 | $p_{5}^{(0)}$ | 0.16 | $p_{5}^{(1)}$ |
| −0.045 | $p_{4}^{(0)}$ | 0.14 | $p_{4}^{(1)}$ |
| −0.055 | $p_{3}^{(0)}$ | 0.12 | $p_{3}^{(1)}$ |
| −0.065 | $p_{2}^{(0)}$ | 0.10 | $p_{2}^{(1)}$ |
| Not more than −0.07 | $p_{1}^{(0)}$ | 0.08 | $p_{1}^{(1)}$ |

| (c) | |
| --- | --- |
| Representative value | Coding symbol |
| −0.08 | $p_{16}^{(-1)}$ |
| −0.10 | $p_{15}^{(-1)}$ |
| −0.12 | $p_{14}^{(-1)}$ |
| −0.14 | $p_{13}^{(-1)}$ |
| −0.16 | $p_{12}^{(-1)}$ |
| −0.18 | $p_{11}^{(-1)}$ |
| −0.20 | $p_{10}^{(-1)}$ |
| −0.22 | $p_{9}^{(-1)}$ |
| −0.24 | $p_{8}^{(-1)}$ |
| −0.26 | $p_{7}^{(-1)}$ |
| −0.28 | $p_{6}^{(-1)}$ |
| −0.30 | $p_{5}^{(-1)}$ |
| −0.32 | $p_{4}^{(-1)}$ |
| −0.34 | $p_{3}^{(-1)}$ |
| −0.36 | $p_{2}^{(-1)}$ |
| Not more than −0.37 | $p_{1}^{(-1)}$ |

As shown in Table 5, if the singular vector difference is larger than −0.07 and smaller than 0.07, $p_i^{(0)}$ (i=2, ..., 15) is coded. If the singular vector difference is not less than 0.07 and smaller than 0.37, $p_{16}^{(0)}$ or $p_i^{(1)}$ (i=1, ..., 15) is coded. If the singular value difference is not more than −0.07 and larger than −0.37, $p_1^{(0)}$ or $p_i^{(-1)}$ (i=2, ..., 15) is coded. In the case of k>1, the coding is performed in a similar manner as shown in Table 6.

TABLE 6

| (a) | | (b) | |
| --- | --- | --- | --- |
| Representative value | Coding symbol | Representative value | Coding symbol |
| Not less than 0.12 | $q_8^{(0)}$ | Not less than 0.40 | $q_8^{(1)}$ |
| 0.10 | $q_7^{(0)}$ | 0.38 | $q_7^{(1)}$ |
| 0.06 | $q_6^{(0)}$ | 0.34 | $q_6^{(1)}$ |
| 0.02 | $q_5^{(0)}$ | 0.30 | $q_5^{(1)}$ |
| −0.02 | $q_4^{(0)}$ | 0.26 | $q_4^{(1)}$ |
| −0.06 | $q_3^{(0)}$ | 0.22 | $q_3^{(1)}$ |
| −0.10 | $q_2^{(0)}$ | 0.18 | $q_2^{(1)}$ |
| Not more than −0.12 | $q_1^{(0)}$ | 0.14 | $q_1^{(1)}$ |

| (c) | |
| --- | --- |
| Representative value | Coding symbol |
| −0.14 | $q_8^{(-1)}$ |
| −0.18 | $q_7^{(-1)}$ |
| −0.22 | $q_6^{(-1)}$ |
| −0.26 | $q_5^{(-1)}$ |
| −0.30 | $q_4^{(-1)}$ |
| −0.34 | $q_3^{(-1)}$ |
| −0.38 | $q_2^{(-1)}$ |
| Not more than −0.40 | $q_1^{(-1)}$ |

Thus, the coding symbols $p_i^{(j)}$ and $q_i^{(j)}$ are coded in the singular vector difference entropy coder 1008.

Figure 1:
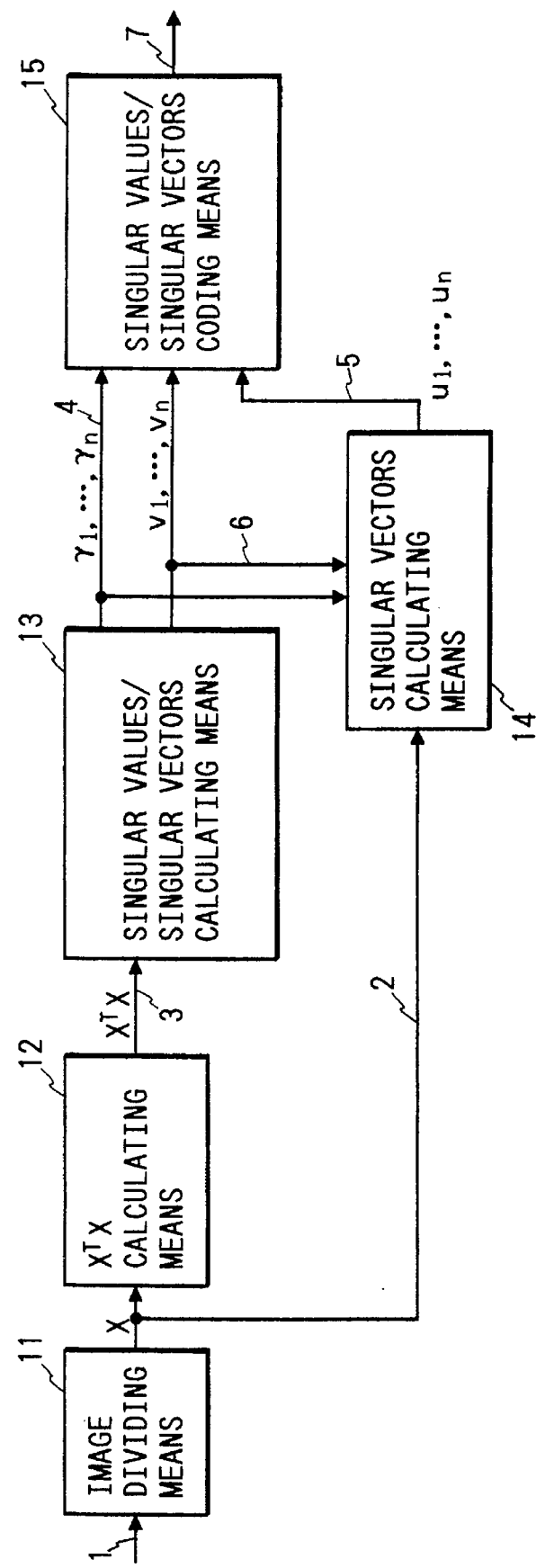
FIG. 1 is a block diagram showing conceptual constitution of a coding apparatus according to a first aspect of the present invention.
Figure 2:
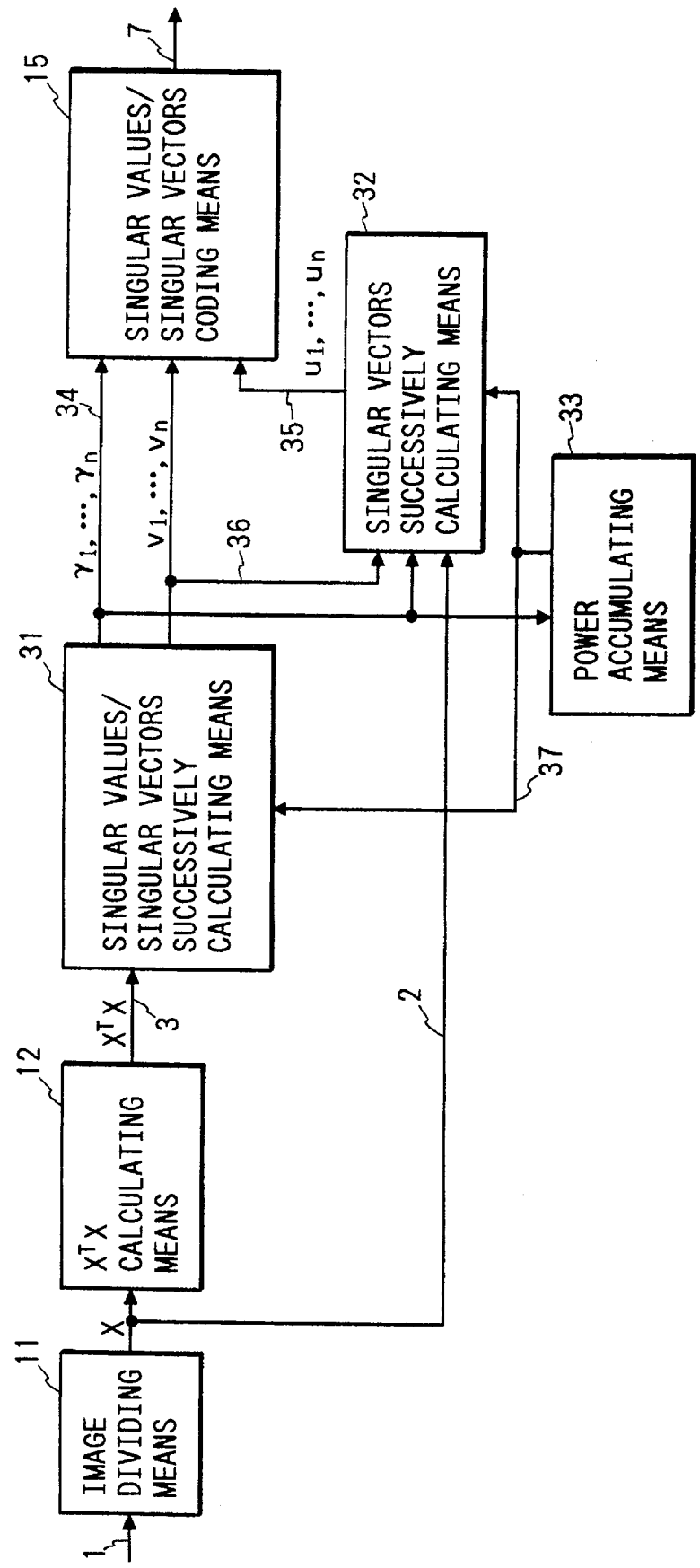
FIG. 2 is a block diagram showing conceptual constitution of a coding apparatus according to a second aspect of the invention.
Figure 3:
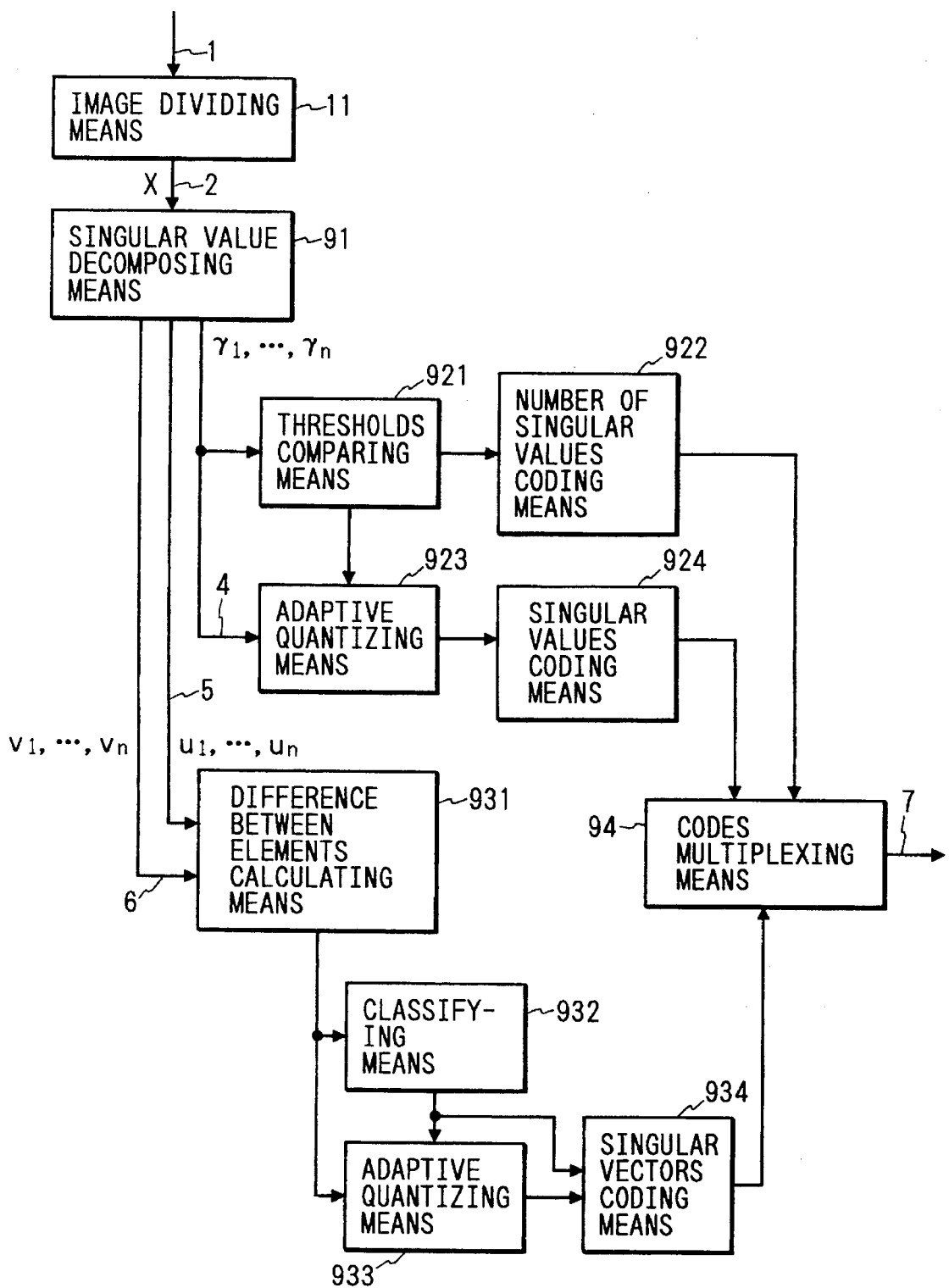
FIG. 3 is a block diagram showing conceptual constitution of a coding apparatus according to a third aspect of the invention.

In the third embodiment shown in FIG. 6, the singular values $\gamma_1, \ldots, \gamma_n$ and the singular vectors $u_1, \ldots, u_n$ and $v_1, \ldots, v_n$ are produced by the singular values/singular vectors calculating circuit 72. Alternatively, an $X^T X$ calculating means 12, a singular values/singular vectors calculating means 13 and a singular vectors calculating means 14 may be provided as in the case of the first embodiment shown in FIG. 1, in which case singular values $\gamma_1, \ldots, \gamma_n$ are supplied from the singular values/singular vectors calculating means 13 to the singular value vs. thresholds comparing circuit 1001 and the singular value quantizer 1003, and singular vectors $v_1, \ldots, v_n$ as output from the singular values/singular vectors calculating means 13 and the singular vectors $u_1, \ldots, u_n$ as output from the singular vectors calculating means 14 are supplied to the singular vector differences calculating circuit 1005.

Although all the singular values and singular vectors are coded in the third embodiment, the number of singular values, singular vectors and singular vector elements may be reduced as in the case of the second embodiment.

Although all the singular vectors are DPCM coded in the third embodiment, only part of the singular vectors may be DPCM coded with the remaining part quantized without taking differences.

Embodiment 4

Referring to FIG. 9, a configuration of a coding apparatus according to a fourth embodiment of the invention will be described. The coding apparatus includes a circuit 71 for dividing an image 1 into blocks each consisting of n×n pixels; a circuit 72 for calculating singular values $\gamma_1, \ldots, \gamma_n$ and singular vectors $u_1, \ldots, u_n$ and $v_1, \ldots, v_n$; a circuit 73 for reducing the number of elements of the singular vectors; and a circuit 76 for coding the singular values $\gamma_1, \ldots, \gamma_n$ and elements-reduced singular vectors $u_1', \ldots, u_n'$ and $v_1', \ldots, v_n'$.

The operation of the above coding apparatus will be described. In the image dividing circuit 71, the image 1 is divided into blocks each of which consists of n×n pixels, i.e., is represented by n-row, n-column matrix X.

An operation performed on one block will be described below.

In the singular values/singular vectors calculating circuit 72, the matrix X is singular value decomposed to produce singular values $\gamma_1, \ldots, \gamma_n$ and singular vectors $u_1, \ldots, u_n$ and $v_1, \ldots, v_n$. As a result of the singular value decomposition, the n-dimensional vectors forming an orthonormal system are obtained. That is, the singular vectors $u_1, \ldots, u_n$ and $v_1, \ldots, v_n$ satisfy Equations (8)–(11). Since Equations (8)–(11) contain signs of equality of $n^2+n$ in total, the original vectors can be restored even if $n^2+n$ elements are removed from the elements of the singular vectors $u_1, \ldots, u_n$ and $v_1, \ldots, v_n$. Assume here vectors $$u_k = (u_{k1}, u_{k2}, \ldots, u_{kn})$$

where $k=1, \ldots, n$. Removing elements $u_{kn-k+1}, \ldots, u_{kn}$, $$u_k' = (u_{k1}, u_{k2}, \ldots, u_{kn-k})$$

where $k=1, \ldots, n$. The singular vectors $u_1, \ldots, u_n$ can be restored from the elements-reduced singular vectors $u_1', \ldots, u_n'$ in the following manner.

Step 1 k is set at 1, and the unknown number $u_{1n}$ of $u_1$ is obtained from $$u_{11}^2 + u_{12}^2 + \ldots + u_{1n}^2 = 1. \tag{23}$$

Step 2 k is increased by 1.

Step 3

Since $u_1, \ldots, u_{k-1}$ have already been determined, $u_{kn}$ is expressed by elements $u_{kn-k+1}, \ldots, u_{kn-1}$ from k–1 first-order equations $$u_{k1} \cdot u_{m1} + u_{k2} \cdot u_{m2} + \ldots + u_{kn} \cdot u_{mn} = 0 \tag{24}$$

where $m=1, \ldots, k-1$, and substituted into an equation $$u_{k1}^2 + u_{k2}^2 + \ldots + u_{kn}^2 = 1. \tag{25}$$

As a result, Equation (25) becomes a quadratic equation of $u_{kn}$, and $u_{kn}$ can be determined. The elements $u_{kn-k+1}, \ldots, u_{kn-1}$ are determined from $u_{kn}$, and $u_k$ is also determined.

Step 4

The above procedure is finished if k=n, and returns to Step 2 if k≠n.

In the above procedure, each of Equations (23) and (25) is a quadratic equation, and has two solutions. A desired one of the two solutions can be obtained by having magnitude of solution information indicating which one (larger or smaller one) of the two solutions of Equations (23) and (25) the desired solution is, in addition to the elements-reduced singular vectors $u_1', \ldots, u_n'$. The magnitude of solution information is obtained from Steps 1–4. Similarly, singular vectors $v_1, \ldots, v_n$ are obtained from the elements-reduced singular vectors $v_1', \ldots, v_n'$.

In the singular vector elements reducing circuit 73, the elements-reduced singular vectors $u_1', \ldots, u_n'$ and $v_1', \ldots, v_n'$ as well as 2n pieces of magnitude of solution information are obtained from the singular vectors $u_1, \ldots, u_n$ and $v_1, \ldots, v_n$.

The elements-reduced singular vectors $u_1', \ldots, u_n'$ and $v_1', \ldots, v_n'$ and the magnitude of solution information, which have been obtained above, and the singular values $\gamma_1, \ldots, \gamma_n$ are coded in the singular values/singular vectors coding circuit 76 to produce codes 7.

Thus, the coding operation on one block is completed. This one-block operation is performed on every block of the image 1.

Referring to FIG. 10, a configuration of a decoding apparatus according to the fourth embodiment will be described. The decoding apparatus includes a circuit 89 for decoding singular values $\gamma_1, \ldots, \gamma_n$, elements-reduced singular vectors $u_1', \ldots, u_n'$ and $v_1', \ldots, v_n'$ and magnitude of solution information; a circuit 83 for extrapolating elements of singular vectors; a circuit 82 for restoring a block X from the decoded singular values $\gamma_1, \ldots, \gamma_n$ and singular vectors $u_1, \ldots, u_n$ and $v_1, \ldots, v_n$; and a circuit 87 for restoring the entire image by combining the blocks X.

In the singular values/singular vectors decoding circuit 89, singular values $\gamma_1, \ldots, \gamma_n$, elements-reduced singular vectors $u_1', \ldots, u_n'$ and $v', \ldots, v_n'$ and magnitude of solution information are decoded.

In the singular vectors extrapolating circuit 83, non-coded elements of the singular vectors are determined by extrapolation according to Steps 1–4.

In the singular values/singular vectors combining circuit 82, a block X is synthesized from the decoded singular values $\gamma_1, \ldots, \gamma_n$ and singular vectors $u_1, \ldots, u_n$ and $v_1, \ldots, v_n$ according to Equation (3).

In the image synthesizing circuit 87, the original image is restored by combining the blocks X.

According to the fourth embodiment, the number of elements of the singular vectors to be transmitted can be reduced from $2n^2$ to $n^2-n$.

In the above description of the fourth embodiment, it has been discussed that the original vectors can be restored even if $n^2+n$ elements are removed from the elements of the singular vectors $u_1, \ldots, u_n$ and $v_1, \ldots, v_n$. On the other hand, the amount of calculation of the coding and decoding apparatuses can be reduced by removing only $n^2-n$ elements from the elements of the singular vectors $u_1, \ldots, u_n$ and $v_1, \ldots, v_n$. This will be explained below. The singular vectors $u_1, \ldots, u_n$ and $v_1, \ldots, v_n$ satisfy Equations (10) and (11). Since Equations (10) and (11) contain signs of equality of $n^2-n$ in total, the original vectors can be restored even if $n^2-n$ elements are removed from the elements of the singular vectors $u_1, \ldots, u_n$ and $v_1, \ldots, v_n$. Assume here vectors $$u_k = (u_{k1}, u_{k2}, \ldots, u_{kn}) \tag{26}$$

where $k=1, \ldots, n$. Removing elements $u_{kn-k+2}, \ldots, u_{kn}$, $$u_k' = (u_{k1}, u_{k2}, \ldots, u_{kn-k+1}) \tag{27}$$

where k=1, ..., n. The singular vectors $u_1, \ldots, u_n$ can be restored from the elements-reduced singular vectors $u_1', \ldots, u_n'$ in the following manner.

Step 1 k is set at 1. Since no element is removed from $u_1$, $u_1$ can be used as it is.

Step 2 k is increased by 1.

Step 3

Since $u_1, \ldots, u_{k-1}$ have been determined, k−1 first-order equations of Equation (24) are obtained. k−1 unknown numbers, i.e., elements $u_{kn-k+2}, \ldots, u_{kn}$ are determined by solving the simultaneous equations of Equation (24). Thus, $u_k$ is determined.

Step 4

The above procedure is finished if k=n, and returns to Step 2 if k≠n.

In the above procedure, unlike the case of the above embodiment, it is not necessary to solve quadratic equations. Therefore, it is sufficient for the singular vector elements reducing circuit 73 to produce the elements-reduced singular vectors $u_1', \ldots, u_n'$ and $v_1, \ldots, v_n'$ from the singular vectors $u_1, \ldots, u_n$ and $v_1, \ldots, v_n$; that is, it is not necessary to produce 2n pieces of magnitude of solution information. This means a reduction of the amount of calculation.

In the singular values/singular vectors coding circuit 76, it is not necessary to code the magnitude of solution information. The singular values/singular vectors decoding circuit 89 need not decode the magnitude of solution information. Further, in the singular vectors extrapolating circuit 83, it is not necessary to solve quadratic equations, unlike the case of the above embodiment. These contribute to the reduction of the amount of calculation.

In addition, the number of elements of the singular vectors to be transmitted is reduced from $2n^2$ (the case of transmitting all the elements) to $n^2+n$.

Although in the fourth embodiment all the singular values and singular vectors are coded, the number of singular elements and singular vectors may be reduced.

All the singular vectors may be subjected to the DPCM coding. Alternatively, only part of the singular vectors may be subjected to the DPCM coding with the remaining part quantized without taking differences.

As described above, according to the first aspect of the invention, it is not necessary to perform a numerical calculation including a converging operation, such as the Jacobi method, to determine the singular vectors $v_1, \ldots, v_n$. The amount of calculation of Equation (6) is on the order of $2n^3$, and is approximately the same as that of the orthogonal transform of Equation (1). In general, the amount of calculation of the Jacobi method, for instance, is larger than that of the orthogonal transform of Equation (1). Thus, the amount of calculation can be reduced.

The second aspect of the invention utilizes the fact that the power is always concentrated in particular singular values in the singular value decomposition and, therefore, it is not always required to code all of the n singular values and singular vectors to perform coding within a certain error range. Further, where the rank r of X is smaller than n, it is meaningless to code singular values and singular vectors of a number exceeding r. By calculating only singular values and singular vectors that are to be transmitted actually, the amount of calculation can be reduced from the case of calculating all the singular values and singular vectors.

According to the third aspect of the invention, since the quantization in the DPCM circuit is performed linearly, the circuit configuration can be simplified from the cases of the quantization of Max and the vector quantization. Further, the number of singular values and singular vectors to be transmitted is adaptively switched on a block-by-block basis in accordance with a positional variation of statistical properties of an image, and the additional information indicating the number of singular values and singular vectors to be transmitted is also transmitted. Since the additional information of the number of singular values can also serve as additional information for the dynamic range adaptive quantization, the overhead of the additional information can be reduced.

According to the fourth aspect of the invention, the number of items to be coded is reduced utilizing the fact that the matrices constituted by the singular vectors are orthonormal matrices. Therefore, the coding efficiency can be improved directly. The number of elements of the singular vectors to be transmitted can be reduced from $2n^2$ to $n^2-n$ or $n^2+n$.

What is claimed is:

1. An image coding apparatus comprising:

means for dividing an input image into image blocks each represented by a block matrix having a predetermined size;

means, coupled to the means for dividing, for calculating a first matrix product of the block matrix and its transpose;

means, coupled to the means for calculating a first matrix product, for successively calculating part of singular values of the block matrix that are positive square roots of eigenvalues of the first matrix product and part of first singular vectors that are normalized eigenvectors of the first matrix product in a descending order of magnitudes of the singular values, the part of the first singular vectors corresponding to the part of the singular values;

means, coupled to the means for dividing and the means for successively calculating, for calculating, from the part of the singular values and the part of the first singular vectors, part of second singular vectors that are normalized eigenvectors of a second matrix product obtained by multiplying the block matrix and its transpose in an order reverse to that of the first matrix product;

means for adding a power of a newly calculated singular value to powers of already calculated singular values to produce an accumulated power, and for finishing a singular value decomposing operation when the accumulated power has reached a predetermined threshold, when a ratio of the accumulated power to a calculated power of the block matrix has reached a predetermined ratio, or when a difference between the accumulated power and the power of the block matrix has reached a predetermined threshold; and means for coding the part of the singular values, the part of the first singular vectors and the part of the second singular vectors.

2. An image coding apparatus comprising:

means for dividing an input image into image blocks each represented by a block matrix having a predetermined size;

means for calculating singular values and singular vectors of the block matrix;

means for grouping the singular values into first classes in accordance with magnitudes of the singular values by comparing the singular values with first thresholds;

means for coding the numbers of singular values belonging to the respective first classes;

means for linearly quantizing each of the singular values adaptively in accordance with a dynamic range of a first class to which the singular value belongs, to produce a first quantized index;

means for coding the first quantized indices;

means for calculating differences between elements of each of the singular vectors;

means for grouping the differences into second classes in accordance with magnitudes of the differences by comparing the differences with second thresholds;

means for linearly quantizing each of the differences while adapting a step width to a second class to which the difference belongs, to produce a second quantized index;

means for coding the classes and the second quantized indices; and means for multiplexing coded data of the numbers of singular values, the singular values and the singular vectors.

3. An image coding and decoding apparatus comprising:

means for dividing an input image into image blocks each represented by an n×n block matrix having a predetermined size;

means, coupled to the image dividing means, for calculating singular values and singular vectors $u_k$ and $v_k$ where k=1, 2, ..., n of the block matrix;

means, coupled to the calculating means, for reducing the number of elements of each of the singular vectors $u_k$ and $v_k$ to n–k elements and for calculating magnitude of solution information indicating one of two solutions of each of 2n elements of the singular vectors $u_k$ and $v_k$; and means, coupled to the reducing means, for coding the singular values and the elements-reduced singular vectors.

4. The image coding and decoding apparatus of claim 3, comprising:

means for decoding the singular values and the elements-reduced singular vectors;

means for calculating, through extrapolation, singular vectors by calculating non-coded elements based on the decoded elements-reduced singular vectors and the magnitude of solution information;

means for restoring an image block from the decoded singular values and the calculated singular vectors; and means for restoring an input image by combining the restored image blocks.

5. An image coding apparatus comprising:

an image divider processing an input image into image blocks each represented by a block matrix having a predetermined size;

a circuit, connected to the image divider, for calculating a first matrix product of the block matrix and its transpose;

a circuit, connected to the image divider, for successively calculating part of singular values of the block matrix that are positive square roots of eigenvalues of the first matrix product and part of first singular vectors that are normalized eigenvectors of the first matrix product in a descending order of magnitude of the singular values, the part of the first singular vectors corresponding to the part of the singular values;

a circuit for calculating, from the part of the singular values and the part of the first singular vectors, part of second singular vectors that are normalized eigenvectors of a second matrix product obtained by multiplying the block matrix and its transpose in an order reverse to that of the first matrix product;

an adder for adding a power of a newly calculated singular value to powers of already calculated singular values to produce an accumulated power, and for finishing a singular value decomposing operation when the accumulated power has reached a predetermined threshold, when a ratio of the accumulated power to a calculated power of the block matrix has reached a predetermined ratio, or when a difference between the accumulated power and the power of the block matrix has reached a predetermined threshold; and a coder for coding the part of the singular values, the part of the first singular vectors and the part of the second singular vectors.

6. An image coding apparatus comprising:

a divider for dividing an input image into image blocks each represented by a block matrix having a predetermined size;

a circuit, connected to the divider, for calculating singular values and singular vectors of the block matrix;

a circuit, connected to the circuit for calculating singular values and singular vectors, for grouping the singular values into first classes in accordance with magnitudes of the singular values by comparing the singular values with first thresholds;

a circuit, connected to the circuit for grouping, for coding the numbers of singular values belonging to the respective first classes;

a circuit, connected to the circuit for calculating singular values and singular vectors, for linearly quantizing each of the singular values adaptively in accordance with a dynamic range of a first class to which the singular value belongs, to produce a first quantized index;

a circuit, connected to the circuit for linearly quantizing, for coding the first quantized indices;

a circuit, connected to the circuit for calculating singular values and singular vectors, for calculating differences between elements of each of the singular vectors;

a circuit, connected to the circuit for calculating the differences, for grouping the differences into second classes in accordance with magnitudes of the differences by comparing the differences with second thresholds;

a circuit for linearly quantizing each of the differences while adapting a step width to a second class to which the difference belongs, to produce a second quantized index;

a circuit, connected to the circuit for linearly quantizing, for coding the classes and the second quantized indices; and a multiplexor for multiplexing coded data of the numbers of singular values, the singular values and the singular vectors.

7. An image coding and decoding apparatus comprising:
- a divider for dividing an input image into image blocks each represented by an n×n block matrix having a predetermined size;
- a circuit, connected to the divider, for calculating singular values and singular vectors $u_k$ and $v_k$ where k=1, 2, . . . , n of the block matrix;
- a circuit, connected to the circuit for calculating, for reducing the number of elements of each of the singular vectors $u_k$ and $v_k$ to n−k elements and for calculating magnitude of solution information indicating one of two solutions of each of 2n elements of the singular vectors $u_k$ and $v_k$; and
- a coder, connected to the circuit for calculating and the circuit for reducing, for coding the singular values and the elements-reduced singular vectors.

8. The image coding and decoding apparatus of claim 7, comprising:
- a decoder for decoding the singular values and the elements-reduced singular vectors;
- a circuit, connected to the decoder, for calculating, through extrapolation, singular vectors by calculating non-coded elements based on the decoded elements-reduced singular vectors and the magnitude of solution information;
- a circuit for restoring an image block from the decoded singular values and the calculated singular vectors; and
- a circuit, connected to the decoder and the circuit for restoring an image block, for restoring an input image by combining the restored image blocks.

* * * * *